(12) United States Patent
Juels

(10) Patent No.: US 8,774,410 B1
(45) Date of Patent: Jul. 8, 2014

(54) SECRET SHARING IN CRYPTOGRAPHIC DEVICES VIA CONTROLLED RELEASE OF PLAINTEXT INFORMATION

(75) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 313 days.

(21) Appl. No.: 13/336,849

(22) Filed: Dec. 23, 2011

(51) Int. Cl.
  *H04L 29/06* (2006.01)

(52) U.S. Cl.
  USPC ............. 380/270; 380/44; 380/277; 380/279; 380/286; 713/193; 713/194; 726/26

(58) Field of Classification Search
  USPC ............ 380/270, 44, 277, 279, 286; 713/193, 713/194; 726/26
  See application file for complete search history.

(56) References Cited

U.S. PATENT DOCUMENTS

| | | | |
|---|---|---|---|
| 4,720,860 A | | 1/1988 | Weiss |
| 5,168,520 A | | 12/1992 | Weiss |
| 5,241,597 A | * | 8/1993 | Bright ........................... 380/286 |
| 5,361,062 A | | 11/1994 | Weiss et al. |
| 6,002,772 A | * | 12/1999 | Saito ............................... 705/58 |
| 6,223,291 B1 | * | 4/2001 | Puhl et al. ....................... 726/28 |
| 6,937,731 B2 | * | 8/2005 | Chiu ............................. 380/270 |
| 6,937,732 B2 | * | 8/2005 | Ohmura et al. ................ 381/86 |
| 7,330,118 B2 | * | 2/2008 | Durham et al. ............ 340/572.1 |
| 7,523,495 B2 | * | 4/2009 | Johnson ........................... 726/20 |
| 7,702,905 B2 | * | 4/2010 | Girao et al. ................... 713/163 |
| 7,707,645 B2 | * | 4/2010 | Haruki et al. .................... 726/27 |
| 8,161,278 B2 | * | 4/2012 | Harkins ......................... 713/155 |
| 8,290,146 B2 | * | 10/2012 | Takashima ..................... 380/28 |
| 8,296,580 B2 | * | 10/2012 | Adams et al. ................. 713/189 |
| 8,417,961 B2 | * | 4/2013 | Olson et al. ................... 713/187 |
| 8,437,476 B2 | * | 5/2013 | Agagliate et al. ............. 380/278 |
| 2003/0026432 A1 | * | 2/2003 | Woodward ..................... 380/278 |
| 2006/0153367 A1 | * | 7/2006 | Beeson ........................... 380/30 |
| 2010/0045441 A1 | | 2/2010 | Hirsch et al. |
| 2011/0028091 A1 | | 2/2011 | Higgins et al. |
| 2012/0311345 A1 | * | 12/2012 | Dhuse et al. .................. 713/189 |

FOREIGN PATENT DOCUMENTS

EP   1826948 B1   8/2008

OTHER PUBLICATIONS

Felica Business Division, "Best Practices White Paper—NFC-F Device Detection," Version 1.0, No. M700—E01-00, Jan. 2011, 25 pages.
T. Rosati et al., "Elliptic Curve Certificates and Signatures for NFC Signature Records," Feb. 2011, 17 pages.

(Continued)

*Primary Examiner* — Kambiz Zand
*Assistant Examiner* — Tongoc Tran
(74) *Attorney, Agent, or Firm* — Ryan, Mason & Lewis, LLP

(57) ABSTRACT

A first cryptographic device generates plaintext information characterizing at least one key or other secret value associated with that device. The first cryptographic device releases portions of the plaintext information to a second cryptographic device over respective time intervals. The portions of the plaintext information are configured by the first cryptographic device such that the second cryptographic device must receive at least a designated minimum number of the portions in order to determine the secret value from those received portions. By way of example, the portions of the plaintext information may be wirelessly transmitted by the first cryptographic device, such that the second cryptographic device must be in wireless contact with the first cryptographic device for at least a designated minimum amount of time in order to receive the designated minimum number of portions required to determine the secret value.

20 Claims, 3 Drawing Sheets

(56) References Cited

OTHER PUBLICATIONS

G.T. Amariucai et al., "An Automatic, Time-Based, Secure Pairing Protocol for Passive RFID," RFIDSec, Jun. 2011, pp. 1-20.

R. Anderson et al., "Key Infection: Smart Trust for Smart Dust," Proceedings of the 12th IEEE International Conference on Network Protocols (ICNP), Oct. 2004, pp. 206-215.

M. Bellare et al., "Key Insulation and Intrusion Resilience Over a Public Channel," Topics in Cryptology—CT-RSA in Lecture Notes in Computer Science (LNCS) 5473, Apr. 2009, pp. 84-99.

M. Bellare et al., "Forward-Security in Private-Key Cryptography," Topics in Cryptology—CT-RSA in Lecture Notes in Computer Science (LNCS) 2612, Feb. 2003, pp. 1-18.

Y. Dodis et al., "A Generic Construction for Intrusion-Resilient Public-Key Encryption," Topics in Cryptology—CT-RSA in Lecture Notes in Computer Science (LNCS) 2964, Feb. 2004, pp. 81-98.

EPCglobal Inc., "EPC Radio-Frequency Identity Protocols, Class 1 Generation-2 UHF RFID Protocol for Communications at 860 MHz-960 MHz, Version 1.2.0," Specification for RFID Air Interface, http://www.gs1.org/gsmp/kc/epcglobal/uhfc1g2, Oct. 2008, pp. 1-108.

Gene Itkis, "Forward Security: Adaptive Cryptography: Time Evolution," Handbook of Information Security, 2006, pp. 1-27, vol. 3, No. 199.

G. Itkis et al., "SiBIR: Signer-Base Intrusion-Resilient Signatures," Advances in Cryptology—CRYPTO in Lecture Notes in Computer Science (LNCS) 2442, Aug. 2002, pp. 499-514.

A. Juels et al., "Unidirectional Key Distribution Across Time and Space with Applications to RFID Security," 17th USENIX Security Symposium, Jul.-Aug. 2008, pp. 75-90.

M. Lehtonen et al., "How to Detect Cloned Tags in a Reliable Way from Incomplete RFID Traces," IEEE International Conference on RFID, Apr. 2009, pp. 257-264.

S.M. More et al., "Sliding-Window Self-Healing Key Distribution," Proceedings of the ACM Workshop on Survivable and Self-Regenerative Systems (SSRS), Oct. 2003, pp. 82-90.

RSA, "Hardware Authenticators," The Security Division of EMC, http://www.rsa.com/node.aspx?id=1158, 2011, 2 pages.

J. Staddon et al., "Self-Healing Key Distribution with Revocation," IEEE Symposium on Security and Privacy, May 2002, pp. 241-257.

Gene Itkis, "Cryptographic Tamper Evidence," Proceedings of the 10th ACM Conference on Computer and Communications Security (CCS), Oct. 2003, pp. 355-364.

U.S. Appl. No. 13/250,225, filed in the name of R.L. Rivest et al. on Sep. 30, 2011 and entitled "Key Update with Compromise Detection."

\* cited by examiner

SECRET SHARING IN CRYPTOGRAPHIC DEVICES VIA CONTROLLED RELEASE OF PLAINTEXT INFORMATION

FIELD

The field relates generally to cryptography, and more particularly to pairing protocols, key management protocols or other techniques that involve sharing of secret values between cryptographic devices in a communication system.

BACKGROUND

In many applications, it is desirable for one computer, server, mobile telephone, RFID tag or other type of cryptographic device to pair with, authenticate or otherwise share secrets such as keys with another cryptographic device. Unfortunately, such arrangements can be problematic when carried out using existing techniques.

For example, a conventional pairing protocol that relies on breakable ciphers is disclosed in G. T. Amariucai et al., "An Automatic, Time-Based, Secure Pairing Protocol for Passive RFID," RFIDSec, 2011, which is incorporated by reference herein. This known pairing protocol is referred to as an "adopted pet" or AP protocol. In the AP protocol, an RFID tag gradually leaks a secret key, such that a reader in proximity to the tag for an extended period of time can learn the secret key. However, a reader that receives tag outputs over only limited-duration intervals of time cannot learn the secret key. Thus, for instance, a tag in a user's home might pair with a reader there overnight, while a maliciously operated reader in a commuter bus would not have sufficient time to harvest the secret key from the tag.

The AP protocol leaks the secret key through a key stream generated by a cryptographically weak pseudorandom number generator (PRNG), such as a linear-feedback shift register (LFSR), seeded by the secret key. By harvesting enough contiguous key stream data, a reader can break the PRNG and recover the secret key. However, this reliance on breakable ciphers has a number of significant drawbacks. For example, breakable ciphers can be difficult to implement in practice, and their security level is difficult to calibrate. Also, requiring the use of breakable ciphers means that the AP protocol will not work with strong, standard ciphers such as the Advanced Encryption Standard (AES). Furthermore, the AP protocol does not permit a flexible range of security policies.

SUMMARY

Illustrative embodiments of the present invention provide improved sharing of keys or other secret values between cryptographic devices without requiring the use of breakable ciphers as in the above-described conventional AP protocol.

In one embodiment, a first cryptographic device generates plaintext information characterizing at least one key or other secret value associated with that device. The first cryptographic device releases portions of the plaintext information to a second cryptographic device over respective time intervals. The portions of the plaintext information are configured by the first cryptographic device such that the second cryptographic device must receive at least a designated minimum number of the portions in order to determine the secret value from those received portions.

By way of example, the portions of the plaintext information may be wirelessly transmitted by the first cryptographic device, such that the second cryptographic device must be in wireless contact with the first cryptographic device for at least a designated minimum amount of time in order to receive the designated minimum number of portions required to determine the secret value.

Accordingly, in one or more of the illustrative embodiments, secret shares may be disclosed using controlled release of over a plaintext channel, in a manner that is compatible with AES and other strong, standard ciphers, while also permitting a flexible range of security policies.

These and other features and advantages of embodiments of the present invention will become more readily apparent from the accompanying drawings and the following detailed description.

DETAILED DESCRIPTION

Illustrative embodiments of the present invention will be described herein with reference to exemplary cryptographic devices and associated authentication and communication systems. It is to be appreciated, however, that embodiments of the invention are not restricted to use with the particular illustrative device and system configurations shown.

The term "cryptographic device" as used herein is intended to be construed broadly, so as encompass, for example, a computer, server, mobile telephone, RFID tag or reader, authentication token or other type of processing device configured to pair with, authenticate or otherwise share secrets such as keys with another cryptographic device.

Figure 1:
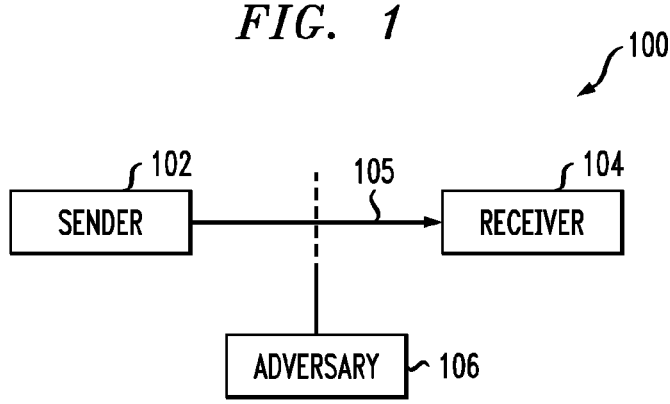
FIG. 1 is a simplified block diagram of an authentication system in an illustrative embodiment of the invention.

FIG. 1 shows a simplified view of an authentication system 100 in an illustrative embodiment of the invention. In the system 100, first and second cryptographic devices are respectively denoted as sender 102 and receiver 104. These devices communicate over a channel 105. An adversary 106 initiates security attacks in the system 100 at least in part by accessing channel 105.

In the system 100, a key or other secret value may be shared by the sender 102 and receiver 104 by controlled release of plaintext information by the sender 102. More particularly, a secret value in the present embodiment may be made apparent by the sender 102 to the receiver 104 by the sender generating plaintext information characterizing the secret value, and releasing portions of the plaintext information to the receiver over respective time intervals. The portions of the plaintext information are configured by the sender such that the receiver must receive at least a designated minimum number of the portions in order to determine the secret value from those received portions. The adversary 106 similarly must receive the designated minimum number of the portions in order to determine the secret value, and as will be described in greater detail below, the system 100 is configured such that it is particularly difficult for the adversary to receive the designated minimum number of the portions. The plaintext information may comprise, for example, any type of information characterizing the secret value and transmitted over a plaintext channel and thus in an unencrypted format.

The sender 102 pairs with or otherwise authenticates the receiver 104 only if the receiver is able to determine the secret value, thereby demonstrating receipt of the designated minimum number of the portions of the plaintext information. A wide variety of conventional pairing protocols or other authentication processes may be implemented in the system 100 based on keys or other shared secret values exchanged by controlled release of plaintext information in the manner disclosed herein. Examples of such authentication processes are disclosed in A. J. Menezes et al., Handbook of Applied Cryptography, CRC Press, 1997, which is incorporated by reference herein. Such processes, being well known to those skilled in the art, will not be described in further detail herein. It is to be appreciated that embodiments of the present invention do not require the use of any particular type of pairing protocol or other authentication process using shared secrets.

Figure 2:
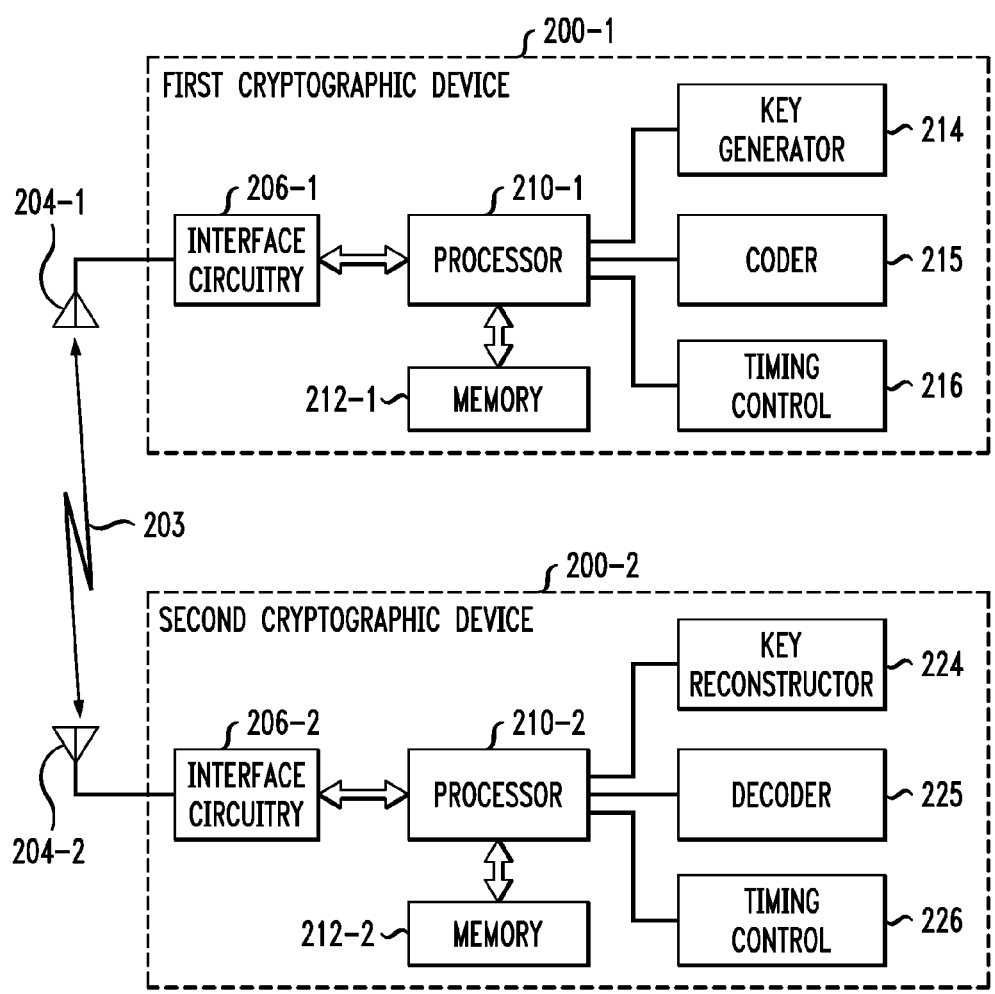
FIG. 2 is a more detailed block diagram of an authentication system comprising multiple cryptographic devices in an illustrative embodiment of the invention.

FIG. 2 shows an exemplary authentication system corresponding generally to an implementation of system 100 in which sender 102 comprises a first cryptographic device 200-1 and receiver 104 comprises a second cryptographic device 200-2. In this embodiment, the cryptographic devices 200-1 and 200-2 communicate with one another over a wireless channel 203 using respective antennas 204-1 and 204-2 and respective interface circuitry 206-1 and 206-2. Each of the cryptographic devices 200 further comprises a processor 210 coupled to a memory 212. The processor 210-1 in device 200-1 is also coupled to other device elements including, by way of example, a key generator 214, a coder 215 and a timing control element 216. Similarly, the processor 210-2 in device 200-2 is also coupled to a number of other device elements, illustratively including a key reconstructor 224, a decoder 225 and a timing control element 226.

The first cryptographic device 200-1 generates a secret value in the form of a key using the key generator 214. For example, the key may be a particular key from a set of keys generated by the key generator 214. More particularly, the set of keys may comprise a set of k-symbol keys $K_1, K_2, \ldots K_M$ that are generated sequentially over time by the first cryptographic device, where the symbols are drawn from a set S. Plaintext information may be generated for a given one of the keys $K_i$, i=1, 2, ... M, by computing a (k,n,d)-erasure code over $K_i$ in coder 215 in order to generate plaintext information for key $K_i$ in the form of a set of n symbols, where n>k. The timing control element 216 is utilized to define time intervals over which respective portions of the plaintext information are released. For example, a different subset of the set of n symbols may be released in each of the time intervals. The second cryptographic device 200-2 must receive at least k+1 symbols out of the n symbols released by the first cryptographic device in order to determine the key $K_i$.

The wireless channel 203 between the cryptographic devices 200-1 and 200-2 in the present embodiment may be configured to utilize a short-range wireless communication protocol, such as Bluetooth, ZigBee, IEEE 802.11, near field communication (NFC), RFID, wireless sensors, etc. It is to be appreciated, however, that other types of wireless communication protocols may be used in other embodiments.

The above-noted controlled release of plaintext information is implemented in this embodiment by wirelessly transmitting the portions of the plaintext information from the first cryptographic device 200-1 to the second cryptographic device 200-2 over the wireless channel 203.

Such an arrangement ensures that the second cryptographic device 200-2 must be in wireless contact with the first cryptographic device 200-1 for at least a designated minimum amount of time in order to receive the designated minimum number of portions required to determine the secret value. For example, the second cryptographic device may be required to remain in continuous radio contact with the first cryptographic device for the designated minimum amount of time, or may be required to have a sufficient number of non-continuous radio contacts that collectively meet the designated minimum amount of time. Numerous other alternatives for satisfying radio contact for the designated minimum amount of time may be used.

This type of required minimum duration of radio contact is particularly difficult for the adversary 106 to achieve, and therefore provides security within the system 100. Thus, as in the conventional AP protocol previously described, a tag in a user's home would be able to pair with a reader there overnight, while a maliciously operated reader in a commuter bus would not have sufficient time to harvest the secret key from the tag. However, this functionality may be achieved in the present embodiment over a plaintext channel, in a manner that is compatible with AES and other strong, standard ciphers, while also permitting a flexible range of security policies. Accordingly, the deficiencies of the conventional AP protocol are avoided in this embodiment.

As a more particular example of an erasure code that may be used in one or more embodiments of the invention, the erasure code may comprise a (k,n,d)=(223,255,32) Reed Solomon (RS) code. Other examples of codes suitable for use in embodiments of the invention include Bose Chaudhuri Hocquenghem (BCH) codes.

Other embodiments of the invention may be configured to operate without the use of an erasure code or other type of code. For example, the first cryptographic device 200-1 could transmit symbols from a cryptographic key, and also transmit a value derived from the key, e.g., a digest. The second cryptographic device 200-2 would utilize the digest and a minimum number of received symbols to recover missing symbols of the key. Such an arrangement involves key transmission rather than ciphertext transmission as in the above-described AP protocol.

As another example, the first cryptographic device 200-1 could transmit arbitrary (e.g., random) symbols. The second cryptographic device 200-2, rather than recovering a key as in the previous example, would instead need to prove possession of a designated minimum fraction of the symbols. It could, for example, transmit back to the first device a ciphertext on received symbols, or a digest thereof, along with symbol indices. The ciphertext may be digitally signed with respect to an accompanying public key PK. The first device, on verifying that the symbols are correct and of sufficient number, would then accept the holder of the corresponding private key SK as an authentic receiver.

It should be emphasized that the above are only examples, and numerous other arrangements involving controlled release of plaintext information may be utilized in other embodiments.

Cryptographic device elements such as interface circuitry 206, processor 210, memory 212 and one or more of the other functional modules of the cryptographic devices 200 may be implemented in whole or in part in the form of one or more integrated circuits.

By way of example, the interface circuitry 206 may comprise conventional transceivers of a type well known in the art, and the processor 210 may comprise a microprocessor, a microcontroller, an application-specific integrated circuit (ASIC), a field programmable gate array (FPGA) or other type of processing circuitry, as well as portions or combinations of such circuitry elements.

The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code embodied in the memory 212 when executed by the processor 210 causes the corresponding cryptographic device to perform functions associated with controlled release of plaintext information. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within the authentication system.

Other device elements such as key generator 214, coder 215 and timing control element 216 in first cryptographic device 200-1 and key reconstructor 224, decoder 225 and timing control element 226 in second cryptographic device 200-2 may be implemented at least in part in the form of software stored in the corresponding memory 212 and executed by the corresponding processor 210. One or more of these elements alternatively may be implemented using a combination of hardware, software and firmware.

Figure 3:
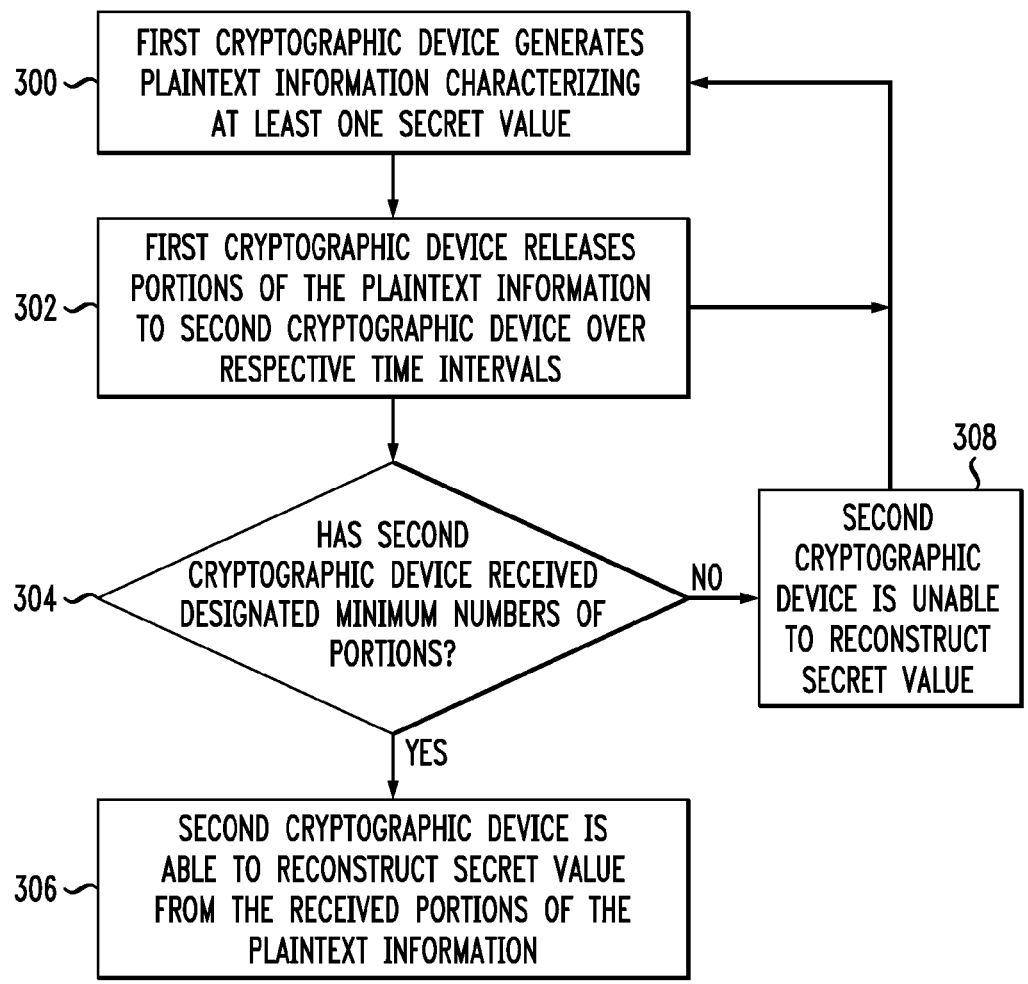
FIG. 3 is a flow diagram of a secret sharing process implemented in the authentication system of FIG. 1 or FIG. 2.

FIG. 3 shows one example of a secret sharing process which implements controlled release of plaintext information in an illustrative embodiment of the invention. This process is implemented by the first and second cryptographic devices 200-1 and 200-2 of FIG. 2, which correspond to the respective sender 102 and receiver 104 of FIG. 1. The secret sharing process as shown in FIG. 3 illustratively includes steps 300 through 308, which may be implemented at least in part utilizing cryptographic device processor and memory elements of the type previously described.

In step 300, the first cryptographic device 200-1 generates plaintext information characterizing at least one secret value associated that device. For example, the secret value may comprise a key generated by the key generator 214, and the plaintext information may be generated by applying an erasure code to that key using the coder 215.

In step 302, the first cryptographic device 200-1 releases portions of the plaintext information to the second cryptographic device 200-2 over respective time intervals. These portions are transmitted over wireless channel 203 for time intervals defined by the timing control element 216. The process may move from step 302 back to step 300 so as to be repeated for one or more additional secret values.

In step 304, the second cryptographic device 200-2 determines if it has received the designated minimum number of portions of the released plaintext information that would be required in order to reconstruct the secret value. The timing control element 226 may be used to coordinate the time intervals utilized by second cryptographic device with those utilized by the first cryptographic device to control release of the portions of the plaintext information. If the designated minimum number of portions has been received, the process moves to step 306, and otherwise the process moves to step 308. The determination in step 304 may be implicit in other embodiments. For example, it may be based on attempts by the second cryptographic device to reconstruct the secret value from particular numbers of received portions. If a given such attempt is successful, the second cryptographic device may assume that the requisite number of portions has been received.

In step 306, the second cryptographic device 200-2 is able to reconstruct the secret value from the designated minimum number of portions. This reconstruction may involve, for example, decoding the above-noted erasure code in decoder 225, and reconstructing the key in key reconstructor 224. The second cryptographic device may of course receive more than the designated minimum number of portions, and may utilize all the received portions in reconstructing the secret value.

In step 308, the second cryptographic device 200-2 is unable to reconstruct the secret value from the designated minimum number of portions, because it has not received the designated minimum number of portions. The process then returns to step 300 as indicated, and as noted above the process may be repeated for additional secret values.

As mentioned previously, in one or more embodiments the secret values may comprise a set of k-symbol keys $K_1$, $K_2, \ldots K_M$ generated sequentially over time by the key generator 214 of the first cryptographic device 200-1, where the symbols are drawn from a set S. For each of the keys $K_i$, $i=1, 2, \ldots M$, the first cryptographic device utilizes coder 215 to compute a (k,n,d)-erasure code over $K_i$ whose output is a set of n>k symbols, although it should be understood that in other embodiments, other types of codes can be used in place of the computation of the (k,n,d)-erasure code over $K_i$.

The first cryptographic device 200-1 emits some number of these n symbols in each of the plurality of time intervals. Provided that the second cryptographic device 200-2 receives at least k+1 symbols out of the n symbols that encode $K_i$, it will be able to reconstruct $K_i$. For example, the second cryptographic device may reconstruct one or more keys $K_i$ of the first cryptographic device in order to establish access to a resource in or associated with the first cryptographic device. If a third cryptographic device associated with adversary 106 has sufficiently limited contact with the first cryptographic device, it will be unable to reconstruct any of the keys $K_i$ of the first cryptographic device.

The first cryptographic device 200-1 may pair with or otherwise authenticate the second cryptographic device 200-2 only if the second cryptographic device is able to determine the secret value. The second cryptographic device may demonstrate its knowledge of the secret value to the first cryptographic device using any of a number of known techniques for proving possession of a secret value.

As indicated previously, the process as shown in FIG. 3 may be repeated periodically in order to provide multiple shared secret opportunities over time.

Other embodiments may use alternative process flows. For example, process steps indicated as being performed serially in FIG. 3 may be performed at least in part in parallel with one another. Also, one or more steps may be combined, as in the above-described alternative arrangement in which the determination of step 304 is made implicit in attempted reconstructions in steps 306 and 308.

In the above embodiments, rather than revealing secret values via breakable ciphers as in the AP protocol, secret values are disclosed over a plaintext channel through controlled release of plaintext information. Such arrangements support a broader range of security policies and are compatible with any cryptographic system, including those based on AES and other strong, standard ciphers.

Accordingly, the authentication system 100 can support a broad range of access control policies through the use of different key update techniques. For example, the keys may be invariant, such that $K_1=K_2=\ldots=K_M$. Alternatively, each key $K_i$ may be a deterministic function of one or more earlier keys. In such arrangements, once the second cryptographic device 200-2 has acquired sufficiently many keys of the first cryptographic device 200-1, it will be able to derive additional keys of the first cryptographic device.

As another example, the keys may be generated independently at random. In an arrangement of this type, the second cryptographic device 200-2 must maintain persistent contact with the first cryptographic device 200-1 to ensure its knowledge of the current key set of the first cryptographic device.

As yet another example, the keys may be partially randomized, such that a portion of each key $K_i$ is a fresh random value while another portion is invariant or deterministic. In an arrangement of this type, the rate at which the second cryptographic device 200-2 must receive symbols initially to learn the keys of the first cryptographic device 200-1 will be lower than the rate at which it must later receive symbols to learn subsequent keys of the first cryptographic device. Alternatively, the second cryptographic device might acquire one of the keys of the first cryptographic device through an alternative channel, e.g., a contact channel, and maintain its knowledge of the first cryptographic device keys through periodic sampling of outputs of that device. Thus, ownership can be established in a straightforward manner, and ownership transfer would occur naturally as a result of extended separation between the two devices.

An authentication system of the type described above in conjunction with FIGS. 1-3 may be implemented in a wide variety of different applications. Two exemplary communication system applications that may incorporate secret sharing via controlled release of plaintext information will now be described with reference to FIGS. 4 and 5.

Figure 4:
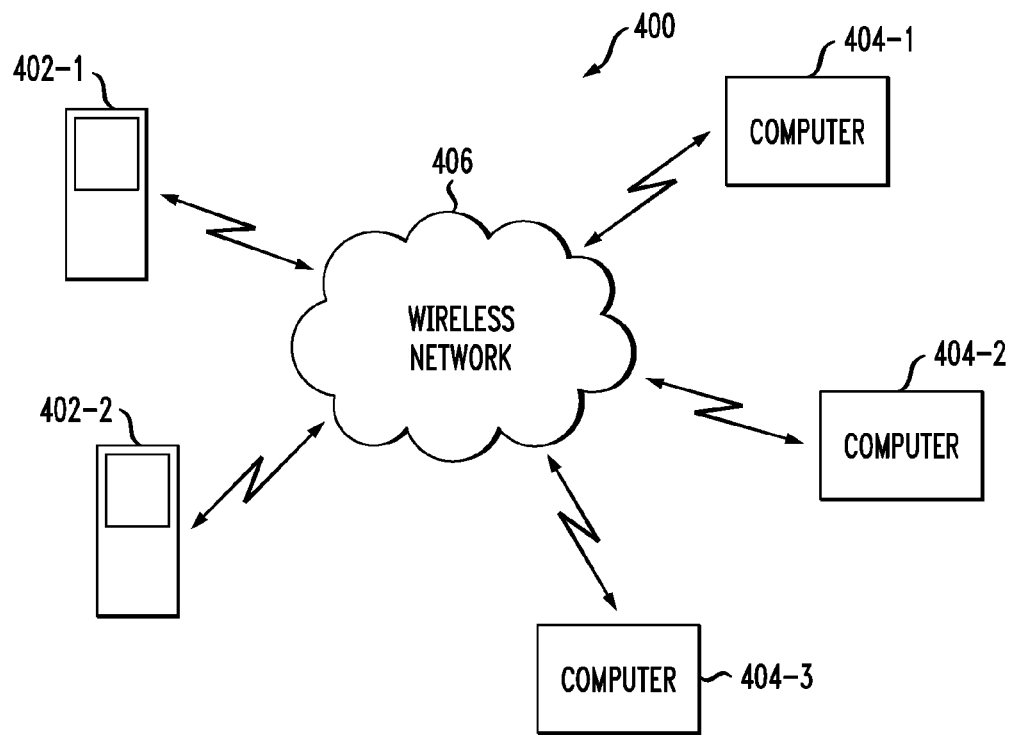
FIGS. 4 and 5 show exemplary communication systems that may incorporate the authentication system of FIG. 1 or FIG. 2.

Referring initially to FIG. 4, a communication system 400 comprises a plurality of mobile telephones 402-1 and 402-2 and computers 404-1, 404-2 and 404-3, configured to communicate with one another over a network 404. The network 404 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Any two or more of the devices 402 and 404 may correspond to cryptographic devices 200-1 and 200-2 and accordingly are configured to implement a secret sharing process via controlled release of plaintext information as previously described. Thus, for example, in the case of consumer goods, a user associated with one of the devices might obtain a registration key for another one of the devices provided that the latter device has been in radio contact with the former device for a minimum amount of time. The time intervals associated with the controlled release of plaintext information may be configured in a straightforward manner to enforce this minimum amount of time.

It should be noted in this regard that a single cryptographic device may be configured both to release portions of plaintext information and to receive such portions released by another cryptographic device. Thus, a given one of the devices 402 or 404 may incorporate modules 214, 215 and 216 as well as modules 224, 225 and 226.

Figure 5:
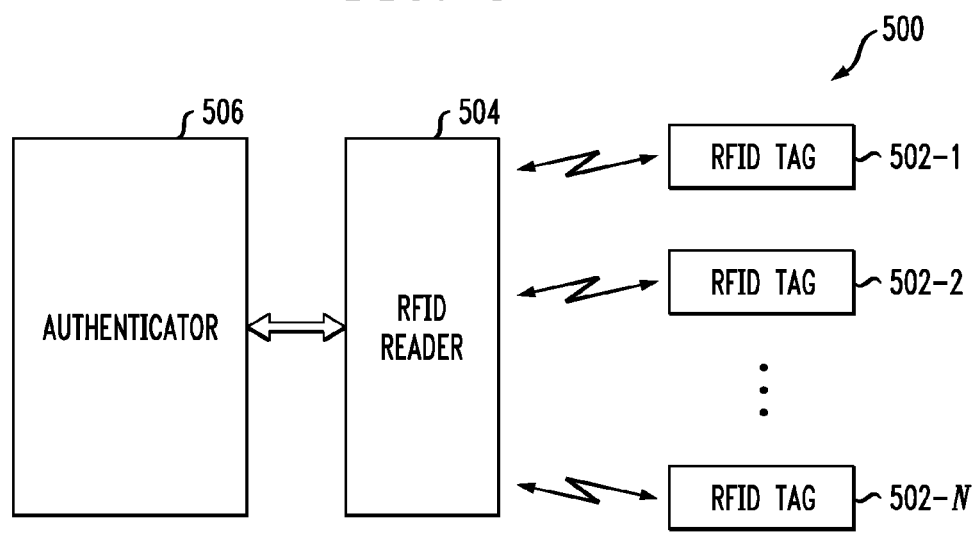

FIG. 5 shows another exemplary communication system 500 in an illustrative embodiment of the invention. In this embodiment, the system 500 is an RFID system comprising RFID tags 502-1, 502-2, . . . 502-N, a reader 504, and an authenticator 506. One or more of the RFID tags 502 may correspond to the first cryptographic device 200-1, and the reader 504, possibly in combination with the authenticator 506, may correspond to the second cryptographic device 200-2. The authenticator 506 may represent, for example, a back-end authentication server configured to authenticate secret values supplied to it by one or more of the RFID tags 302 via the reader 504. The system 500 may be configured such that a given one of the RFID tags 502 might allow its contents to be read or otherwise accessed only by a reader that has been in radio contact with the tag for a minimum period of time, e.g., five minutes. Such a security policy would eliminate many casual scanning attacks, while making key management relatively simple.

It is to be appreciated that the techniques disclosed herein can be implemented in numerous other applications. For example, in other embodiments, the first and second cryptographic devices may comprise an authentication token and an authentication server, respectively, or may comprise an authentication token and a computer or other host device, respectively. In such arrangements, the authentication token may comprise a time-synchronous authentication token such as the RSA SecurID® user authentication token, commercially available from RSA, The Security Division of EMC Corporation, of Bedford, Mass., U.S.A.

It should again be emphasized that the above-described embodiments of the invention are presented for purposes of illustration only. Many variations and other alternative embodiments may be used. For example, the techniques are applicable to a wide variety of other types of cryptographic devices that can benefit from secret sharing over plaintext channels. Also, the particular configuration of system and device elements shown in FIGS. 1, 2, 4 and 5, and the secret sharing process shown in FIG. 3, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
generating plaintext information characterizing at least one secret value associated with a first cryptographic device; and
releasing portions of the plaintext information from the first cryptographic device to a second cryptographic device over respective time intervals;
wherein the portions of the plaintext information are configured by the first cryptographic device such that the second cryptographic device must receive at least a designated minimum number of the portions in order to determine the secret value from those received portions; and
wherein the step of generating plaintext information comprises:
obtaining a key comprising at least a portion of the secret value;
computing an erasure code over the key to generate a set of symbols; and
utilizing the set of symbols as at least part of the plaintext information.

2. The method of claim 1 further comprising the step of permitting the first cryptographic device to authenticate the second cryptographic device only if the second cryptographic device is able to determine the secret value.

3. The method of claim 1 wherein the releasing step further comprises wirelessly transmitting the portions of the plaintext information.

4. A method comprising the steps of:
generating plaintext information characterizing at least one secret value associated with a first cryptographic device; and releasing portions of the plaintext information from the first cryptographic device to a second cryptographic device over respective time intervals;

wherein the portions of the plaintext information are configured by the first cryptographic device such that the second cryptographic device must receive at least a designated minimum number of the portions in order to determine the secret value from those received portions;

wherein the releasing step further comprises wirelessly transmitting the portions of the plaintext information; and wherein the second cryptographic device must be in wireless contact with the first cryptographic device for at least a designated minimum amount of time in order to receive the designated minimum number of portions required to determine the secret value.

5. The method of claim 1 wherein the secret value comprises a particular key from a set of keys generated by the first cryptographic device.

6. The method of claim 5 wherein the set of keys comprises a set of k-symbol keys $K_1, K_2, \ldots K_M$ that are generated sequentially over time by the first cryptographic device.

7. The method of claim 6 wherein the step of generating plaintext information comprises computing for a given one of the keys $K_i$, $i=1, 2, \ldots M$, a (k,n,d)-erasure code over $K_i$ to generate a set of n symbols, where n>k, the plaintext information for key $K_i$ comprising the set of n symbols.

8. The method of claim 7 wherein the step of releasing portions of the plaintext information over respective time intervals comprises releasing a different subset of the set of n symbols in each of the time intervals.

9. The method of claim 8 wherein the second cryptographic device must receive at least k+1 symbols out of the n symbols released by the first cryptographic device in order to determine the key $K_i$.

10. The method of claim 5 wherein the keys of the set are invariant.

11. A method comprising the steps of:
generating plaintext information characterizing at least one secret value associated with a first cryptographic device; and releasing portions of the plaintext information from the first cryptographic device to a second cryptographic device over respective time intervals;

wherein the portions of the plaintext information are configured by the first cryptographic device such that the second cryptographic device must receive at least a designated minimum number of the portions in order to determine the secret value from those received portions;

wherein the secret value comprises a particular key from a set of keys generated by the first cryptographic device; and wherein at least one of the keys of the set is generated as a deterministic function of one or more previously-generated keys of the set, such that after the second cryptographic device has acquired a sufficient number of keys of the set, it can determine one or more additional keys of the set.

12. The method of claim 5 wherein the keys of the set are generated independently at random.

13. A method comprising the steps of:
generating plaintext information characterizing at least one secret value associated with a first cryptographic device; and releasing portions of the plaintext information from the first cryptographic device to a second cryptographic device over respective time intervals;

wherein the portions of the plaintext information are configured by the first cryptographic device such that the second cryptographic device must receive at least a designated minimum number of the portions in order to determine the secret value from those received portions;

wherein the secret value comprises a particular key from a set of keys generated by the first cryptographic device; and wherein the keys of the set are partially randomized, such that one portion of each key comprises a fresh random value while another portion is invariant or deterministic.

14. The method of claim 5 wherein portions of the plaintext information are released to the second cryptographic device over one channel and at least one of the keys of the set is provided to the second cryptographic device through another channel.

15. A computer program product comprising a processor-readable storage medium having embodied therein one or more software programs, wherein the one or more software programs when executed by a processor cause the steps of the method of claim 1 to be performed.

16. An apparatus comprising:
a first cryptographic device comprising a processor coupled to a memory;
the memory storing at least one secret value;
the first cryptographic device being configured under control of the processor to generate plaintext information characterizing the secret value, and to release portions of the plaintext information to a second cryptographic device over respective time intervals;
wherein the portions of the plaintext information are configured by the first cryptographic device such that the second cryptographic device must receive at least a designated minimum number of the portions in order to determine the secret value from those received portions; and wherein, in generating the plaintext information, the first cryptographic device is configured under control of the processor to:
obtain a key comprising at least a portion of the secret value;
compute an erasure code over the key to generate a set of symbols; and
utilize the set of symbols as at least part of the plaintext information.

17. The apparatus of claim 16 wherein the processor permits the first cryptographic device to authenticate the second cryptographic device only if the second cryptographic device is able to determine the secret value.

18. The apparatus of claim 16 wherein the first cryptographic device further comprises a wireless transmitter, wherein the portions of the plaintext information are released by transmitting those portions using the wireless transmitter, and wherein the second cryptographic device must be in wireless contact with the first cryptographic device for at least a designated minimum amount of time in order to receive the designated minimum number of portions required to determine the secret value.

19. The apparatus of claim 16 wherein a given one of the first and second cryptographic devices comprises one of a computer and a mobile telephone.

20. The apparatus of claim 16 wherein the first cryptographic device comprises an RFID tag and the second cryptographic device comprises an RFID tag reader.

* * * * *